United States Patent Office 3,337,629
Patented Aug. 22, 1967

3,337,629
1,2-BIS(DIFLUOROAMINO)ETHYLNITRAMINE AND PROCESS OF PREPARATION
Robert A. Smiley, Woodbury, N.J., assignor to E. I. du Pont de Nemours and Company, Wilmington, Del., a corporation of Delaware
No Drawing. Filed June 8, 1961, Ser. No. 115,824
4 Claims. (Cl. 260—583)

This invention relates to a rocket propellant and explosive compound, and to a process for its preparation.

The compound of the invention is 1,2-bis(difluoroamino)ethylnitramine, which has the formula:

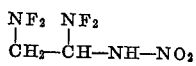

The compound has a high percentage of energetic groups in the molecule, i.e., 54% by weight of $-NF_2$ groups and 31% by weight of the $>N-NO_2$ (nitramine) group. The high energy released upon the decomposition of nitramines is well-known to those familiar with the explosives art, compounds containing nitramine groups being useful as high explosives. In recent years, the presence of $-NF_2$ groups in a molecule has become recognized as an important source of energy, compounds containing such groups having been found to impart a high specific impulse to rocket propellants. The novel compound of the present invention therefore presents great interest for use in rocket propellants as well as explosives.

1,2-bis(difluoroamine)ethylnitramine can be prepared by the reaction of 1,2-bis(difluoroamino)ethyl isocyanate with a nitrating mixed acid, i.e., nitric acid admixed with an agent which assists in the formation of the nitronium ion, $NO_2^+$. Agents which have been used for this purpose in nitration reactions are sulfuric acid, acetic acid, acetic anhydride, trifluoroacetic anhydride, and others. In the preparation of the novel compound of the present invention, the use of any of the mixed acids commonly used in the nitration of alcohols is feasible. However, for economic reasons, the use of a nitric acid-sulfuric acid mixture is preferred. Mixtures having percent compositions corresponding to those ordinarily used in the nitration reactions can be used, e.g., mixtures ranging from 20% $HNO_3$/60% $H_2SO_4$/20% $H_2O$ to 55% $HNO_3$/48% $H_2SO_4$ (said to have a negative percentage of water, $-3$%).

The amount of nitric acid used in the preparation of the compound of the invention is at least one mole per mole of isocyanate, i.e., the stoichiometric amount required for the reaction. However, an excess of nitric acid generally will be used in order to assure complete reaction. Mole ratios of nitric acid to isocyanate of 1/1 to about 10/1 or higher can be used.

The reaction between the isocyanate and the nitrating mixed acid preferably is carried out in an inert diluent and at a temperature of about 40° C. or lower. The diluent assists in dissipating the heat of reaction and in decreasing the oxidizing action of the nitric acid. Preferably, the inert diluent is a low-boiling compound, such as one of the chlorinated hydrocarbons, e.g., methylene chloride or chloroform.

The reaction proceeds satisfactorily at room temperature and below, the preferred operating range being from about 0° C. to about 40° C. The process can be effected at atmospheric as well as superatmospheric pressure. Generally, however, there is no advantage in operating at superatmospheric pressure with the possible exception that such pressure may be desirable when a low-boiling diluent is used.

The following example serves to illustrate a preferred method of preparing the novel compound of the present invention. Parts are by weight. The example will be understood to be illustrative only and not to limit the invention in any manner. In the synthesis described in the example, 1,2-bis(difluoroamino)ethyl isocyanate was prepared by the Curtius rearrangement of acrylyl azide to vinyl isocyanate, followed by the reaction of the isocyanate with tetrafluorohydrazine. The procedure was as follows:

A solution of 362 parts of acrylyl chloride (prepared from acrylic acid and benzoyl chloride) in 1600 parts of chloroform was added dropwise to a stirred solution of 428 parts of sodium azide in 1000 parts of water over a period of 6 hours. A reaction temperature of 15–20° C. was maintained. The chloroform layer containing acrylyl azide was separated and dried, and then distilled in the presence of hydroquinone of effect rearrangement of acrylyl azide to vinyl isocyanate. The latter was distilled at 39° C. and atmospheric pressure. The reaction of vinyl isocyanate with tetrafluorohydrazine was carried out by passing equimolar amounts of the reactants (as gases) through copper coils heated to 155° C. The 1,2-bis(difluoroamino)ethyl isocyanate formed was condensed, and then distilled under vacuum (50° C. at 60 mm.).

EXAMPLE

A solution of 5 parts of 1,2-bis(difluoroamino)ethyl isocyanate in 138 parts of methylene chloride was cooled to a temperature of 2° C. To the stirred solution was added 9 parts of a mixture of 50% nitric acid and 50% sulfuric acid (by weight). The mixture was stirred for an additional 30 minutes and then neutralized with 15 parts of urea. (If the acid is not neutralized, violent decomposition of the acid layer takes place when the organic layer is separated.) The urea salt which formed was filtered off, and the methylene chloride solution was agitated with magnesium sulfate, filtered, and the methylene chloride removed under vacuum. The residue was maintained under high vacuum overnight and then distilled to give 2 parts of a colorless liquid, which boiled at 52° C. (at 0.25 mm.). The liquid was identified as 1,2-bis(difluoroamino)ethylnitramine by infrared, nuclear magnetic resonance, and mass spectrograph analysis. The infrared spectrum showed $>NH$ absorption at $2.98\mu$, a very strong $-NO_2$ absorption of $6.17\mu$, and strong $-NF_2$ absorption at $11.38\mu$. The fluorine and proton resonance spectra showed the presence of $-CH_2NF_2$, $-CHNF_2$, and $>NH$. Mass ion fragments found were: 28 ($N-N^+$), 46 ($NO_2^+$), 30 ($NO^+$)

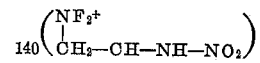

33 ($NF^+$), and 15 ($NH^+$).

1,2-bis(difluoroamino)ethylnitramine dissolves in aqueous ammonium carbonate or sodium bicarbonate with the evolution of carbon dioxide. The nitramine is insoluble in water and in carbon tetrachloride, but is soluble in chloroform (solubility properties typical of nitramines). The $D_4^{20}$ is 1.55.

1,2-bis(difluoroamino)ethylnitramine is an explosive compound as well as a propellant as evidenced by the following properties:

Sensitivity to heat

The nitramine detonates when heated to 140° C. gradually (ca. 5° C./minute) in a copper block.

Impact sensitivity

In the pure state, the nitramine is very sensitive to impact and will detonate under a 2-kg. weight dropped 2 inches.

*Specific impulse*

Calculated specific impulse (frozen) as a monopropellant: 282 sec.

Calculated specific impulse (shifting) as a monopropellant: 291 sec.

The invention has been described in detail in the foregoing. It will be apparent to those skilled in the art that many variations are possible without departure from the scope of the invention. Therefore, I intend to be limited only by the following claims.

I claim:

1. A compound represented by the following formula:

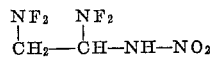

2. A process for the preparation of 1,2-bis(difluoroamino)ethylnitramine which comprises reacting 1,2-bis(difluoroamino)ethyl isocyanate with a nitrating acid in an inert diluent at a temperature within the range of about 0° C. to about 40° C.

3. A process according to claim 2, wherein the nitrating acid is a mixture of nitric acid and sulfuric acid.

4. A process according to claim 2, wherein the inert diluent is a chlorinated hydrocarbon.

References Cited

UNITED STATES PATENTS 2,011,578   8/1935   Hale _____ 260—583 X

CHARLES B. PARKER, *Primary Examiner.*

R. L. RAYMOND, *Assistant Examiner.*